Patented July 30, 1935

2,009,436

UNITED STATES PATENT OFFICE 2,009,436

NONCAKING PIGMENT

Cole Coolidge and Harold S. Holt, Wilmington, Del., assignors to E. I. du Pont de Nemours & Company, Wilmington, Del., a corporation of Delaware No Drawing. Application May 24, 1932, Serial No. 613,262

6 Claims. (Cl. 134—58)

This invention relates to non-caking pigments and non-caking pigmented coating compositions and, more particularly, to a method of providing a protective film on individual pigment particles in order to prevent caking of the pigment in various coating compositions. The present application is a continuation in part of applicants' copending application Serial No. 278,909, filed May 18, 1928, which has resulted in U. S. Patent No. 1,863,834, "Non-caking pigmented coating compositions and process of making same."

It is desirable first to comment briefly upon the behavior of certain pigments in prior art coating compositions in regard to the phenomenon known as "caking". As pigmented coating compositions have been ordinarily prepared, the pigments have been distributed or dispersed in the coating compositions by various means to a degree satisfactory from a practical standpoint as far as the immediate condition of the composition is concerned. However, after standing for a period of time, such compositions have exhibited a tendency for the sedimentation of the pigment, this process or phenomenon developing eventually to the point where the pigment becomes massed and tough with the ageing of the composition, so that finally a hardness and dryness of the settled pigment takes place, which makes it very difficult to reincorporate the pigment in the composition to the same degree of dispersion existing originally. In some cases the cake so formed can be redispersed to a degree where the composition can be used, but this operation requires expenditure of energy and time, and, as a rule, it is difficult to obtain the original degree of dispersion without resorting to regrinding.

Experience has shown that frequently a comparatively large percentage of the pigment could not readily be redispersed owing to an insufficient degree of stirring, with a resulting quality unsatisfactory to the consumer. An inferior quality resulted because the covering power was decreased, lumpy particles were present in the film, and off-tints in the case of light colors were encountered. Such a condition existing in paint products represented definitely undesirable qualities while in low viscosity products, such as brushing enamels, it has constituted a serious and objectionable feature. The tendency for the formation of a hard cake in the manner set forth varies with the pigment and also with the vehicle. It has been found that in certain instances it is possible to select for a given vehicle certain pigments which do not hard-cake to an extreme degree in the normal life of a shelf product, but this is not always a matter of free choice, as it is often necessary to use pigments with definite hard-caking tendencies in order to obtain certain necessary or desirable characteristics in the final products. Such a case may be illustrated by the more highly pigmented enamels, such as white and light shades, the latter representing tinted white in most cases. The combination of high density pigment, or a pigment of an abnormal hard-caking tendency, with a low viscosity vehicle, represents a system which frequently develops a maximum in hard-caking, this objectionable property being produced to a degree which is worse than in most enamel and paint products of the prior art. The importance of hiding power, the highly uniform surface character, and the necessity for close matches in tint render the off-quality characteristics imparted by hard-caking particularly serious in the case of enamel type products.

On the other hand, some paint, enamel, and lacquer compositions do not develop hard-caking owing to the peculiar nature of the systems involved, but nevertheless this hard-caking phenomenon has been frequently experienced in many kinds of prior art formulations for paints, lacquers, enamels, et cetera.

It will be clear from this discussion that we are not discussing a mere sedimentation or temporary deposition of pigment particles that can be easily remedied by stirring, but we are rather referring to a result of deposition or settling of particles which results in the formation of a hard cake that is most difficult to reincorporate with the vehicle and which, generally speaking, exhibits the characteristics of toughness, hardness, and resistance to stirring and reincorporation in the vehicle.

An object of the present invention is to provide a process of preparing non-caking pigmented coating compositions whereby the difficulties discussed above may be eliminated. A further object is to provide a non-caking pigment which may be incorporated in various vehicles by standard methods to give a non-caking composition. A further object of the invention is to provide a simple and economical method of treating pigments to give them non-caking properties. A more specific object is to provide a non-caking titanium oxide pigment. Other objects will be apparent from the description of the invention given hereinafter.

The above objects are accomplished according to the present invention by depositing a film of a protective agent from the group consisting of waxes and stearin pitch on the individual particles of the pigment mass. The protective agent may be deposited on the pigment particles before incorporating in the vehicle whereby, upon drying, a substantially dry, non-caking pigment mass may be obtained, suitable for incorporation in any vehicle by standard methods, or the protective agent may be deposited on the pigment particles while making up the coating composition.

The following examples are given to illustrate preferred specific embodiments of the invention, parts being given by weight:—

*Example 1.*—This example relates to the preparation of a titanium oxide pigment paint in which the hard-caking tendencies have been overcome by means of a mixture of Carnauba and paraffin waxes. The titanium oxide pigment is a well known commercial mixture of titanium oxide and barium or calcium sulfate. The composition of the base was as follows:

|   | Parts |
|---|---|
| Titanium oxide pigment | 457 |
| Linseed oil | 194 |
| Chinawood oil | 34.1 |
| Cobalt linoleate | .9 |
| Naphtha | 114 |
| Wax solution | 22.4 |
|  | 822.4 |

From this base the paint was formulated as follows:

|   | Parts |
|---|---|
| Base | 790 |
| Linseed oil | 182 |
| Chinawood oil | 32.2 |
| Cobalt linoleate | .8 |
| Naphtha | 123.7 |
|  | 1128.7 |

The wax solution referred to above had the following composition:

|   | Parts |
|---|---|
| Carnauba wax | 1.6 |
| Paraffin wax | 7.9 |
| Turpentine substitute | 90.5 |
|  | 100.0 |

*Example 2.*—This example relates to the preparation of lithopone free from hard-caking properties by pre-treating the lithopone with Carnauba wax.

Forty grams of Carnauba wax were dissolved in one quart of turpentine by heating at 70 to 100° C. Two kilos of lithopone were stirred with one gallon of turpentine and the wax solution then added. The mixture was stirred for 1.5 hours and the solvent then removed by evaporation at reduced pressure. As a result of this procedure, the pigment particles were coated with wax and did not hard-cake when used in coating compositions of various types.

*Example 3.*—This example relates to the preparation of lithopone free from hard-caking properties by pre-treating the lithopone with Montan wax.

Two kilos of lithopone were treated with forty grams of Montan wax by a procedure identical to that described in Example 2. After removal of the solvent under reduced pressure, the pigment particles no longer formed a hard-cake when used in coating compositions of various types.

*Example 4.*—This example relates to the preparation of lithopone free from hard-caking tendencies by pre-treating the lithopone with Carnauba wax in a medium other than turpentine.

Two kilos of lithopone were treated with forty grams of Carnauba wax dissolved in one gallon of low-flash naphtha. The procedure was identical to that of Examples 2 and 3 except that naphtha was employed in the place of turpentine.

*Example 5.*—This example relates to the preparation of a white paint in which hard-caking of the pigment was prevented by means of Montan wax. The following mixture was ground in a pebble mill:

|   | Parts |
|---|---|
| Lithopone | 800 |
| Zinc oxide | 430.8 |
| Linseed oil | 551 |
| Blown linseed oil | 50.2 |
| Drier pastes | 35.2 |
| 16% solution of Montan wax in turpentine | 150 |

The mixture was ground for 36 hours in a ball mill with a 2/1 pebble/charge ratio and the paint then thinned with gasoline to a suitable consistency for use.

*Example 6.*—This example relates to the preparation of a white paint in which hard-caking of the pigment was prevented by means of Carnauba wax. The following mixture was ground in a pebble mill:

|   | Parts |
|---|---|
| Lithopone | 800 |
| Zinc oxide | 430.8 |
| Linseed oil | 551 |
| Blown linseed oil | 50.2 |
| Drier paste | 35.3 |
| 16% solution of Carnauba wax in turpentine | 150 |

The mixture was ground for 36 hours in a ball mill with a 2/1 pebble/charge ratio and the paint then thinned with gasoline to 138 g., 10 seconds in a Gardner-Parks mobilometer.

*Example 7.*—This example relates to the preparation of a nitrocellulose lacquer in which hard-caking of the pigment was prevented by means of Montan wax. The formula was as follows:

|   | Parts |
|---|---|
| Nitrocellulose solution (25% non-volatile) | 344.0 |
| Damar gum solution (59% non-volatile) | 40.3 |
| Lithopone coated with 2% Montan wax | 100.0 |
| Castor oil | 18.7 |
| Dibutyl phthalate | 28.6 |
| Butyl acetate | 71.0 |
| Denatured alcohol | 17.8 |
| Butyl alcohol | 52.3 |
| Toluene | 16.5 |
| Naphtha | 62.9 |

The method of manufacture was as follows: The lithopone was first treated with Montan wax by stirring the lithopone with a turpentine solution of Montan wax in the ratio of 100 parts lithopone to 2 parts wax. The excess turpentine was then removed by evaporation under reduced pressure. The wax-treated lithopone was then ground with the damar gum solution and 50 parts of butyl acetate in a ball mill for 15 hours using a 2 to 1 ball/charge ratio. The mill was thoroughly washed out with the remaining butyl acetate (21 parts) and the washings added to the grind. To this was then added the castor oil, dibutyl phthalate, remaining thinner and finally the nitrocellulose solution.

*Example 8.*—The composition prepared in this example was identical to that in Example 7 except that lithopone was used which had previously been treated with Carnauba wax instead of with Montan wax.

*Example 9.*—The composition prepared in this example was identical to that in Example 8 except that in treating the lithopone with the Carnauba wax, a naphtha solution was used instead of a turpentine solution. The subsequent grinding procedure and manner of formulation was identical to that of Example 7.

*Example 10.*—This example relates to the preparation of a nitrocellulose composition in which hard-caking was prevented by means of stearin pitch.

The pigment was first mixed with a naphtha dispersion of stearin pitch to produce a uniform paste containing:

| | Parts |
|---|---|
| Naphtha | 10.5 |
| Stearin pitch | 0.55 |
| Butyl acetate | 1.3 |
| Titanium oxide pigment | 55.0 |

To this paste, in which the agent has been associated with the pigment, was added:

| | Parts |
|---|---|
| Ethyl alcohol | 6.1 |
| Damar gum | 6.1 |
| Toluene | 2.3 |

The mixture was transferred to a pebble mill and ground for 12 hours. Let us call this mixture Base "A".

The remaining constituents were mixed in a separate container as follows:

| | Parts |
|---|---|
| Butyl acetate | 16 |
| Ethyl ether of ethylene glycol | 10 |
| Butyl alcohol | 10 |
| Ethyl alcohol | 7.9 |
| Gasoline | 3.4 |
| Toluene | 4.2 |
| Damar gum | 3.9 |
| Nitrocellulose (½ second viscosity) | 10 |
| Dibutyl phthalate | 4 |

Let us call this lacquer admixture Base "B".

Base "A" was then run into Base "B" with efficient agitation, following which the lacquer was adjusted to suitable brushing viscosity with butyl acetate.

The pigment may be thoroughly mixed with the naphtha dispersion of stearin pitch prior to addition of the remainder of the grinding vehicle. Any suitable stearin pitch solvent system may be used in place of naphtha and, if necessary, the solvent may be partially or completely removed by filtration or evaporation before incorporation with the grinding constituents. Another method consists in adding the stearin pitch solution at some stage of the grinding operation. A still further modification consists in incorporating the stearin pitch solution by mixing it into the grinding base following the grinding operation. Another modification consists in the dry-milling of the pigment with the protective agent without the use of any diluent or solvent for the agent, and this will be followed by incorporation of the grinding constituents.

*Example 11.*—This example relates to the preparation of a titanium oxide pigment paint in which hard-caking was prevented by means of stearin pitch.

Two kilograms of titanium oxide pigment were treated with a solution of 20 grams stearin pitch in naphtha. The insoluble part of the pitch was discarded. Mixing was carried out in a Werner and Pfleiderer Mixer and after standing in contact with the pitch solution for 3 hours, the pigment was dried at room temperature. The pigment was used in preparing paints according to the following formula:

| | Grams |
|---|---|
| Treated titanium oxide pigment | 2286 |
| Linseed oil | 96.6 |
| China-wood oil | 17.2 |
| Cobalt linoleate | .5 |
| Turpentine | 85 cc. |

When the turpentine was replaced by other diluents, protection against hard-caking was equally effected. Among the solvents in which stearin pitch was effective as a protective agent were carbon tetrachloride, toluene, cymene, gasoline, butyl acetate, ethyl acetate, acetone and butanol.

*Example 12.*—This example relates to the use of stearin pitch for the prevention of hard-caking in a polyhydric alcohol-polybasic acid resin type undercoating composition, such as a primer.

Base

| | Parts |
|---|---|
| Iron oxide | 24.2 |
| Lamp black | 4.6 |
| Asbestine | 11.2 |
| China clay | 13.9 |
| Talc | 11.1 |
| 10% Stearin pitch solution in a mixture of equal parts gasoline and Hi-flash naphtha | 6.5 |
| Gasoline | 9.0 |
| Hi-flash naphtha | 9.0 |
| 50% Polyhydric alcohol-polybasic acid resin solution in Hi-flash naphtha | 40.0 |
| | 129.5 |

This mixture was ground three passes on a 10-inch buhrstone mill and then formulated into a primer as follows:

| | Parts |
|---|---|
| Base | 129.5 |
| 50% Polyhydric alcohol-polybasic acid resin solution in Hi-flash naphtha | 30.0 |
| Gasoline | 40.0 |
| Hi-flash naphtha | 40.0 |

Thinned to desired spraying viscosity.

In the foregoing examples we have devised procedures and formulations as a result of which the pigment is incorporated in the vehicle or composition in such a manner that hard-caking is prevented and thereby the aforesaid objects of the invention have been attained. As may be ascertained from the examples, this hard-caking is prevented by employing a wax or stearin pitch in one form or another in such a manner as to deposit it or coat it upon the pigment particles so that the pigment will be put in a condition where it will not cake together to form a hard, tough mass that would resist an attempt to stir it or disperse it again into the vehicle, but it is rather in such a condition that, even though it might be inclined to deposit sediment, it would not form a hard cake but could be readily re-incorporated in the vehicle or composition by a reasonable amount of stirring or suitable agitation. The said deposition of the agent has the effect of separating the particles and thereby avoiding caking.

As will be seen from the examples offered by us, this agent, which we may call a protective agent, may be applied in various ways, depending upon the circumstances, and the agent itself may be different in various cases. The various modifications in which our invention may be carried out will be further discussed in the following paragraphs.

As regards the protective agent itself, we may employ in addition to those cited, a large number of others as follows: spermaceti, candelilla wax, crude Montan wax, beeswax, laurel wax, sugar cane wax, gondang wax, pisang wax, palm wax, raphia wax, rhimba wax, psylla wax, a variety of stearin pitches, and a number of synthetic ester-waxes such as lauryl stearate, cetyl palmitate, waxes obtained by the hydrogenation of fats and oils, and waxes obtained from aldehydes by aldol condensation, reduction, and esterification. Agents of this type have been found to be effective in the media used for paint products such as in nitrocellulose compositions, varnish vehicles, oil vehicles, polyhydric alcohol-polybasic acid resin vehicles and other synthetic resin vehicles. These agents will vary in effectiveness according to the system in which they are used, and it is necessary to select by trial the agent or agents particularly suited for the pigment or pigment-vehicle system concerned.

The invention is applicable to pigments in general, but is especially effective in treating pigments having a specific gravity above 2.5, since such pigments have a strong tendency to hard-cake. Pigments of this type include lithopone, lakes, white lead, zinc oxide, iron oxide, chrome yellows and greens, Prussian blue, and, especially, titanium oxide pigments. The titanium oxide pigments have a most pronounced tendency to hard-cake. The term "titanium oxide pigment" as used herein is intended to include pigments containing titanium oxide whether alone, in physical admixture with other pigments, or in chemical combination.

As illustrated by the foregoing examples, the specific formulation and mode of deposition of the protective agent in the pigment will vary with the particular circumstances, no two cases being exactly alike. The protective agent may first be dispersed or dissolved in all or a portion of one of the constituents of the vehicle, after which the pigment is incorporated with this dispersion. If this general method is followed, the portion of the vehicle chosen as a solvent or dispersion medium should preferably be one simple liquid or a mixture of such containing no substance which might inhibit absorption or deposition of the protective agent upon the pigment. The protective agent will be used in quantity to form a film let us say of at least molecular dimensions on the pigment particles. Ordinarily, from 0.25% to 1.0% by weight of protective agent, based on the pigment, is sufficient to prevent hard-caking, though occasionally from one to two per cent is desirable. If the composition is stored at very low viscosity and must stand for a very long period of time, an amount as high as 5%, or in rare cases, 10%, may be desirable. The agent is incorporated with the pigment by thorough mixing and agitation of the pasty mass whereby all pigment particles are brought into intimate contact with the protective agent. In most cases it is desirable to substitute for this mixing operation a grinding procedure.

The remainder of the vehicle is then added and the whole thoroughly mixed. As referred to earlier in this specification and in the examples, the pigment may be pre-treated with the protective agent by mixing the pigment with a solution of the protective agent and then removing the solvent. The treated pigment can then be used in compositions of any desired type. Another method of employing the protective agent is by milling it directly with the dry pigment prior to using it in composition. The protective agent, or its solution in an organic solvent, may be emulsified or dispersed in water and incorporated into a water slurry of the pigment. Following this, the emulsion or dispersion may be broken by known means such as the addition of acids, alkalies, or salts, and the protective agent thereby deposited on the pigment particles, the slurry of protective agent and pigment being filtered to reduce the water content. In any case, the treated pigment is dried prior to use.

We have found as a result of a large number of experiments that, whereas the untreated pigment sooner or later settles into a hard dry cake, redispersed only with difficulty, the pigment treated with an effective protective agent settles with a soft, loose cake which is easily re-dispersed. These results are obtained whether the settling tests are carried out at room temperature or at elevated temperatures. In referring to lacquers having a nitrocellulose base, we desire to state that other cellulose esters, such as cellulose acetate, and also other cellulose derivatives, such as cellulose ethers, may be employed.

As many apparently widely different embodiments of this invention may be made without departing from the spirit and scope thereof, it is to be understood that the invention is not limited to the specific embodiments thereof except as defined in the appended claims.

We claim:

1. A substantially dry titanium oxide pigment mass in finely divided form, the individual particles of which have a film on their surfaces of a protective agent from the group consisting of waxes and stearin pitch, the protective agent being from 0.25 to 5.0% based on the weight of the pigment mass whereby said pigment mass is substantially non-caking in a coating composition.

2. A substantially dry titanium oxide pigment mass in finely divided form, the individual particles of which have a film on their surfaces of a protective agent from the group consisting of waxes and stearin pitch, the protective agent amounting to from 0.25-2.0% based on the weight of the pigment mass whereby said pigment mass is substantially non-caking in a coating composition.

3. A substantially dry titanium oxide pigment mass in finely divided form, the individual particles of which have a film on their surfaces of Carnauba wax as a protective agent, said protective agent being from 0.25 to 5.0% based on the weight of the pigment mass whereby said pigment mass is substantially non-caking in a coating composition.

4. A substantially dry titanium oxide pigment mass in finely divided form, the individual particles of which have a film on their surfaces of Montan wax as a protective agent, said protective agent being from 0.25 to 5.0% based on the weight of the pigment mass whereby said pigment mass is substantially non-caking in a coating composition.

5. A substantially dry titanium oxide pigment mass in finely divided form, the individual particles of which have a film on their surfaces of Carnauba wax as a protective agent in amount from 0.25 to 2.0% based on the weight of the pigment mass whereby said pigment mass is substantially non-caking in a coating composition.

6. A substantially dry titanium oxide pigment mass in finely divided form, the individual particles of which have a film on their surfaces of Montan wax as a protective agent in amount from 0.25 to 2.0% based on the weight of the pigment mass whereby said pigment mass is substantially non-caking in a coating composition.

COLE COOLIDGE.
HAROLD S. HOLT.